June 17, 1952  T. R. WYCOFF  2,600,599
SINK MOLDING
Filed Nov. 14, 1949
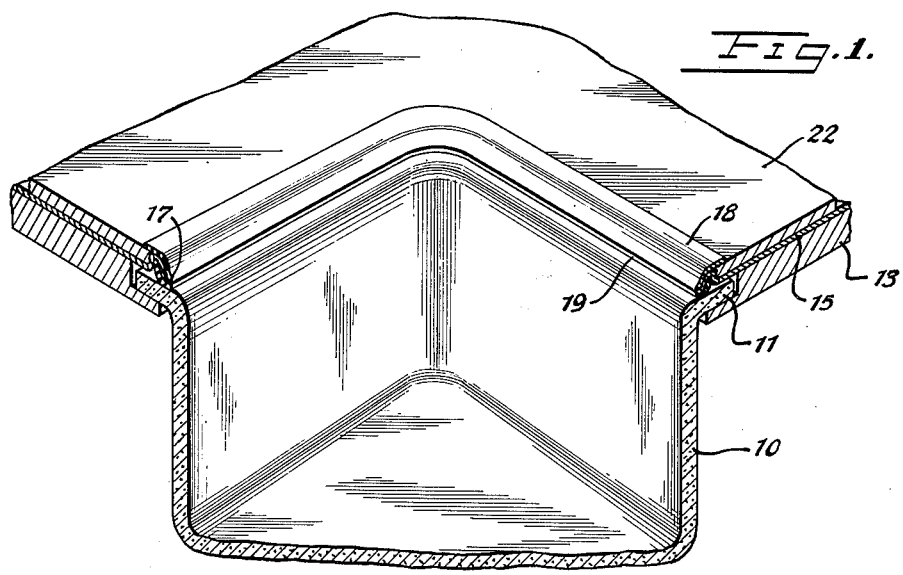
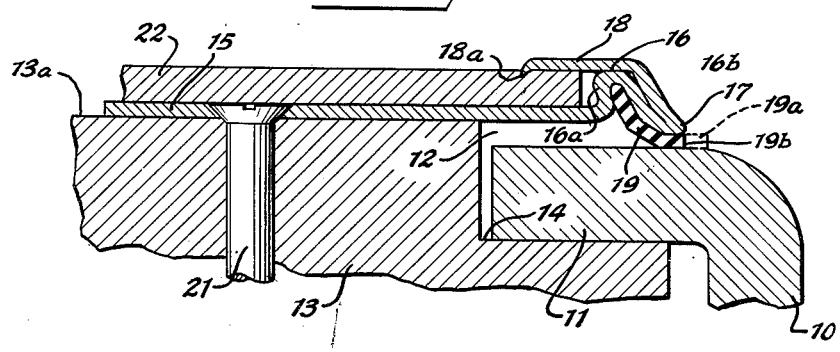
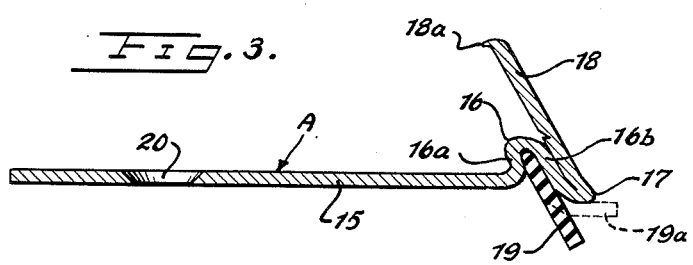
INVENTOR.
THOMAS R. WYCOFF.
BY
Thomas F. Healy
ATTORNEY Patented June 17, 1952

2,600,599

UNITED STATES PATENT OFFICE 2,600,599

SINK MOLDING

Thomas R. Wycoff, Columbus, Ohio

Application November 14, 1949, Serial No. 126,946

1 Claim. (Cl. 4—187)

The present invention relates to improvements in a sink moulding and has for an object the provision of a moulding of this kind which has a sealing gasket formed integrally therewith.

Another object of the present invention is to provide an improved moulding and gasket unit for use with kitchen sinks, lavatories, showers, bathtubs and the like.

A further object of the present invention is to provide an improved moulding structure in which the gasket will seal out moisture and will automatically adjust itself for unevenness, expansion or contraction, settling of the members of the fixture to which applied and any change in the mechanical relation between the parts sealed by the gasket.

A still further object of the present invention is to provide an improved device of this character in which the gasket is made of flexible long-wearing and grease resistant material.

The present invention aims to provide an improved moulding which is of simple construction, cheap to manufacture and easy to install.

In one of its broadest aspects the present invention contemplates the provision of an improved moulding comprising a main body portion, a gasket gripping portion, and a gasket secured in said gripping portion.

With the foregoing and other objects in view, the invention will be hereinafter more fully described and more particularly pointed out in the appended claim.

In the drawings, in which the same parts are denoted by the same reference numerals throughout the several views:

Figure 1 is a fragmentary perspective view of a sink illustrating the improved moulding applied thereto, with parts broken away and in section;

Figure 2 is a sectional view of the same; and

Figure 3 is a sectional view of the improved moulding constructed in accordance with the present invention.

Referring more particularly to the drawing, 10 indicates a kitchen sink or the like having a rim 11 which is received by a rabbeted groove 12 formed in a cabinet top 13. The rim 11 of the sink rests upon the bottom 14 of the groove 12. The improved moulding generally indicated at A comprises a main body portion 15, a substantially inverted U-shaped gasket gripping portion 16, a nose 17, a lip 18 and a gasket 19.

The moulding may be formed from sheet metal such as stainless steel, aluminum, or rolled or extruded from other suitable materials, such as plastic, and the substantially U-shaped gripping portion 16 is formed by making a double bend adjacent one edge portion of the sheet of material. The formation of the double bend will provide gripping or clamping jaws 16a and 16b, which are connected by the closed part of the U-shaped gripping portion 16. One edge portion of the gasket 19 is firmly gripped between the jaws 16a and 16b of the gripping portion 16 and the adjacent edge of the gasket abuts the inner face of the closed part of the U-shaped gripping portion 16.

The gasket 19 may be in the form of a strip of plastic or other appropriate material which is "live" and has an inherent tendency to return to its original flat condition as illustrated in full lines in Figure 3 of the drawing. The jaw 16b is longer than the jaw 16a and extends downwardly below the horizontal plane of the main body portion 15 of the moulding A and is bent upwardly upon itself to form the nose 17. From the nose 17 the moulding extends upwardly to provide the lip 18, the free edge portion of which is bent inwardly to provide a sharp flange 18a. The opposite end portion of the moulding A is provided with upwardly flared openings 20 to provide countersunk screw holes. It is to be understood that openings 20 may be of any desired shape depending upon the fastening means employed.

If desired, the jaw 16b need not extend downwardly below the horizontal plane of the main body portion 15 of the moulding A, but may be even with or above portion 15, all depending upon the type of sink, or the like, to which the moulding is applied.

In the use of the device, assuming for purposes of illustration only, that the improved moulding A is to be employed in connection with the installation of a kitchen sink, the sink 10 is positioned in the cabinet top 13 with the rim 11 of the sink received by the groove 12 thereof and resting upon the bottom 14 of the groove 12. The main body portion 15 of the moulding A will then be secured to the upper surface 13a of the cabinet top 13 by wood screws or the like 21 which are received by the openings 20 of the moulding A.

An appropriate covering material 22, such as linoleum or the like, is applied to the upper surface 13a of the cabinet top 13 and to the main body portion 15 of the moulding A. The lip 18 which is in the position illustrated in Figure 3 of the drawing will now be ironed from this standing position downwardly into engagement with the adjacent edge portion of the covering 22. The sharp flange 18a of the lip 18 will be embedded into the covering 22 to provide a moisture-tight seal at this point as is shown in Figure 2 of the drawing.

As the screws 21 are screwed home the free end portion of the gasket 19 will be confined between the upper face of the rim 11 of the sink and the nose 17 of the moulding A. The adjacent face of the gasket 19 will be engaged by the inner face of the jaw 16b. Since the jaw 16b is preferably disposed at an angle of the order of approximately forty-five degrees to the upper face of the rim 11 of the sink and since the face of the jaw 16b is curved downwardly and outwardly, the gasket 19 will be deformed from its original flat condition illustrated in Figure 3 to the position shown in Figure 2 of the drawing. This deformation of the gasket 19 will place it under a strain so that it will tend to return to its original flat position.

In the event that the settling occurs between the moulding A and the sink rim 11, the gasket 19 will spring downwardly and maintain a moisture-proof seal between the nose 17 of the moulding A and the rim 11 of the sink 10. Likewise, any unevenness in the rim 11 of the sink 10 will be compensated for by this inherent characteristic of the gasket to return to its original flat condition. In the same manner expansion or contraction of the various parts due to temperature changes will be fully compensated for.

The provision of this gasket will prevent moisture from entering between the moulding and the rim of the sink. This moisture would travel along the rim of the sink and wet the cabinet top 13. It has been known that this moisture will travel four inches to six inches in the cabinet top and rot the covering material 22 from underneath. Frequently this moisture seepage causes a warping in the cabinet top which opens the original seepage groove and allows still further moisture to enter.

As shown in dotted lines in Figure 2 of the drawing a portion 19a of the gasket 19 extends outwardly beyond the nose 17 of the moulding. This extended portion 19a of the gasket 19 may be trimmed off along the line 19b by a sharp instrument such as a razor blade, knife or the like. The nose 17 of the moulding may be used as a guide when trimming off the extended portion 19a of the gasket 19. The strip of gasket material 19 is inserted in the moulding during fabrication thereof and the gasket is tightly clamped in place during the manufacturing of the moulding. In other words, the moulding and the gasket are manufactured as a unit and are delivered as such to the person who will install it.

This invention primarily embraces the concept of providing an improved moulding comprising a main body portion, a gasket gripping portion, and a gasket secured in said gripping portion.

More particularly, the invention embraces a moulding for use with a sink, wall, or the like, fixture, with said sink or the like having a rim received by a groove in a cabinet, comprising a main body portion adapted for use with a sink or the like installation with said sink having a rim received by a groove in a cabinet, and a covering for said cabinet, an improved moulding comprising a main body portion adapted to be mounted on the upper surface of said cabinet, a gripping portion, a gasket secured in said gripping portion and having a portion adapted to engage the rim of the sink when the main body portion is mounted on said cabinet, a nose adapted to clamp said gasket into firm engagement with the rim of the sink and a lip having a sharp flange adapted to be embedded in said covering.

It is obvious that various modifications may be made in the details of construction and design of the above specifically described embodiment of this invention without departing from the spirit thereof, such changes and modifications being restricted only by the scope of the following claim.

What I claim is:

For use with a sink or the like installation with said sink having a rim received by a groove in a cabinet, and a covering for said cabinet, an improved moulding comprising a main body portion adapted to be mounted on the upper surface of said cabinet, a gripping portion, a gasket secured in said gripping portion and having a portion adapted to engage the rim of the sink when the main body portion is mounted on said cabinet, a nose adapted to clamp said gasket into firm engagement with the rim of the sink and a lip having a sharp flange adapted to be embedded in said covering.

THOMAS R. WYCOFF.

REFERENCES CITED

The following references are of record in the file of this patent:

UNITED STATES PATENTS

| Number | Name | Date |
|---|---|---|
| 973,744 | Best | Oct. 25, 1910 |
| 1,464,258 | Cochran | Aug. 7, 1923 |
| 1,487,748 | Maise | Mar. 25, 1924 |
| 1,743,677 | Mauthe | Jan. 14, 1930 |
| 2,208,836 | Edwards | July 23, 1940 |
| 2,228,186 | Thumm | Jan. 7, 1941 |
| 2,505,828 | Fox | May 2, 1950 |